United States Patent [19]
Pipes

[11] 3,716,147
[45] Feb. 13, 1973

[54] STACKER CRANE ORDER PICKER
[75] Inventor: George R. Pipes, South Euclid, Ohio
[73] Assignee: Eaton Yale & Towne, Inc., Cleveland, Ohio
[22] Filed: Feb. 22, 1971
[21] Appl. No.: 117,365

[52] U.S. Cl................214/1 BT, 214/2, 214/8.5 D, 214/152, 214/309, 214/16.4 A, 294/65
[51] Int. Cl................................................B65g 59/04
[58] Field of Search........214/1 BT, 2, 8.5 D, 650 SG, 214/309, 152; 294/65

[56] References Cited

UNITED STATES PATENTS 3,351,219  11/1967  Ruderfer.................214/8.5 R X
2,578,220  12/1951  Billner....................294/65

Primary Examiner—Gerald M. Forlenza
Assistant Examiner—George F. Abraham
Attorney—Yount and Tarolli

[57] ABSTRACT

An article-handling apparatus removes a predetermined number of articles from a matrix of articles. The article-handling apparatus includes an article-engaging means which is movable to an article pickup position at which the article engaging means picks up articles. The article-handling apparatus also includes sensing means which is associated with the article pickup means and operates to sense the number of articles supported by the article-pickup means. The sensing means controls a means which is operable to control the number of articles picked up by the article pickup means.

7 Claims, 6 Drawing Figures

INVENTOR
GEORGE R. PIPES
BY Yount and Tarolli
ATTORNEYS

INVENTOR
GEORGE R. PIPES
BY Yount and Tarolli
ATTORNEYS

STACKER CRANE ORDER PICKER

The present invention relates to an article-handling method and apparatus and, more particularly, relates to an article-handling method and apparatus for removing a predetermined number of articles from a matrix of articles.

Known automated handling systems include storage racks or bins for storing articles and a suitable handling device for retrieving the articles from storage. Certain prior art article-handling devices are capable of removing a plurality of articles supported on a pallet from a storage rack. Other prior art article-handling devices are capable of removing individual articles from a matrix of articles supported on a storage rack. However, no known article-handling device is capable of removing a selected number of articles from a given matrix of articles.

The present invention is directed to a method and an apparatus in which a selected number of articles may be removed from a matrix. This is effected by providing a device with a plurality of article-engaging members which are movable to a position adjacent to a matrix of articles. The article-engaging members are energized to pick up articles. The energization of the article-engaging members is controlled by a sensor which controls the article-engaging members.

More specifically, the present invention utilizes suction members for picking up the articles. The sensor means senses if more than the desired number of articles have been picked up and controls deactivation of the suction members to release articles in the event that too many articles have been picked up. Moreover, each of the sucker members has a valve associated therewith which closes to render the sucker member ineffective if the sucker member is not located properly with respect to an article to be picked up.

The principal object of the present invention is the provision of a new and improved method and apparatus for handling articles and which provides substantial flexibility in the selection of the number of articles which are removed from a matrix of articles by providing for removal of either individual articles or a selected number of articles from the matrix.

A further object of the present invention is the provision of a new and improved method and apparatus for removing a predetermined number of articles from a matrix of articles and wherein an article pickup means moves to an article pickup position and picks up articles, and sensing means, which senses the number of articles picked up by the article pickup means, is operable to control the article pickup means and thereby control the number of articles picked up.

A still further object of the present invention is the provision of a new and improved apparatus for removing a predetermined number of articles from a matrix of articles and wherein the apparatus includes a plurality of suction devices for picking up the articles and wherein the individual suction devices have a valve associated therewith and which valve is controlled to control whether or not the suction device picks up an article.

Another object of the present invention is the provision of a new and improved apparatus, as noted in the next preceding paragraph, wherein the valve associated with a suction device will close in the event that the suction device is not located properly over an article to be picked up.

Further objects and advantages of the present invention will be apparent to those skilled in the art to which it relates from the following detailed description of a preferred embodiment thereof made with reference to the accompanying drawings forming a part of this specification and in which.

The present invention relates to an article-handling method and apparatus wherein provision is made for removing a selected number of articles from a matrix of articles. The article-handling method and apparatus of the present invention provides substantial flexibility in the selection of articles from the matrix of articles and also provides for the removal of any one or a plurality of articles from the matrix. The present invention may be applied to different handling systems and may be utilized for handling of different types of articles. The present invention, however, is illustrated in FIG. 1 as applied to an article-handling system, generally designated 10.

Figure 1:
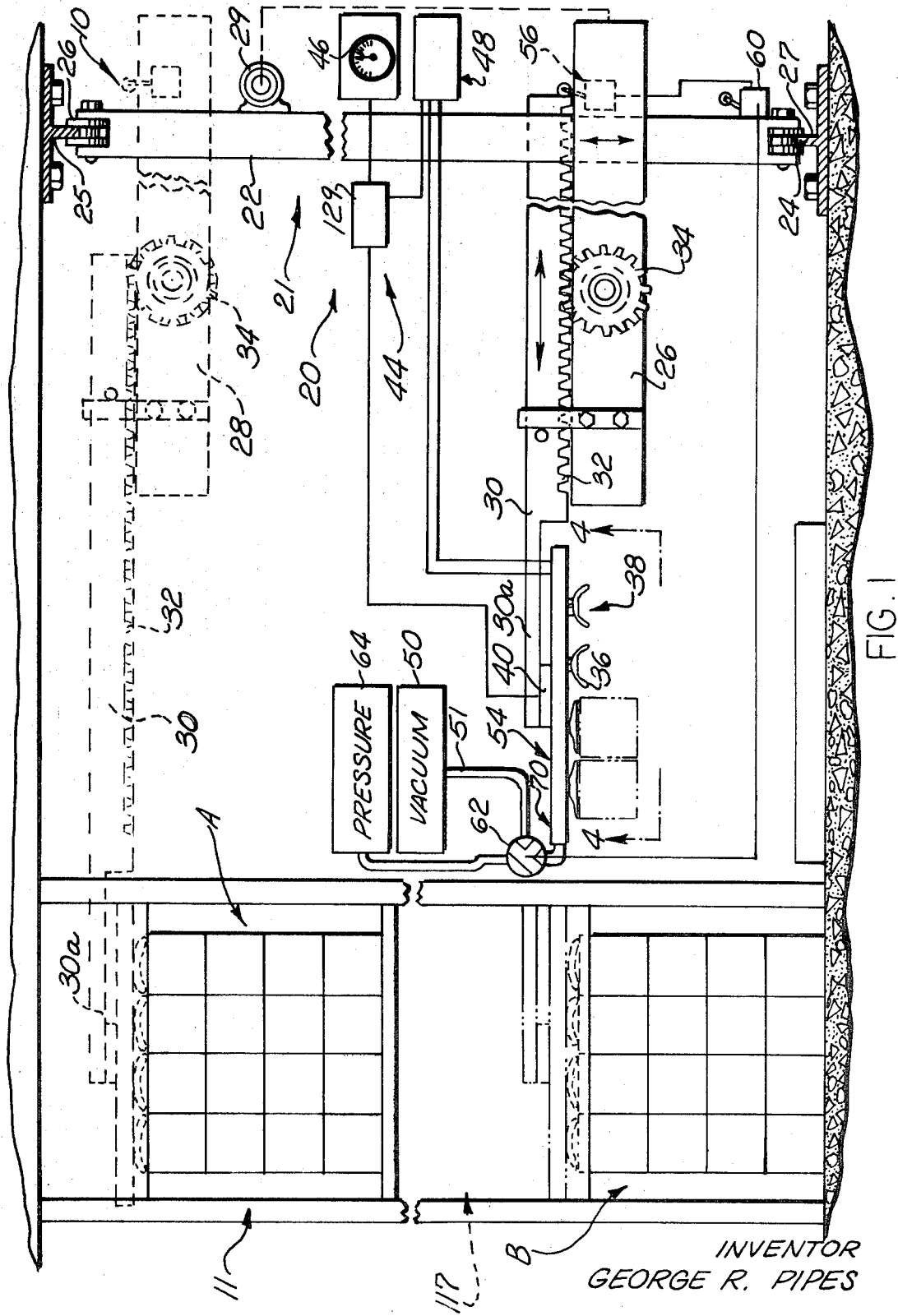
FIG. 1 is a schematic view of an article-handling system embodying the present invention.

The article-handling system 10, as shown in FIG. 1, includes a storage rack 11 which contains a plurality of stacks of articles, designated at A and B. The system 10 includes a suitable article-handling apparatus 20 which functions to deliver and remove articles from the storage rack 11. The article-handling apparatus 20 may take many different forms and has not been shown in the drawings in detail, but rather only a schematic illustration thereof.

The article-handling apparatus 20 includes a suitable stacker crane 21 which has a mast 22. The mast 22 is provided with wheels 24, 26 at its opposite ends which run on the tracks 25, 27 to guide the mast as it moves in a path adjacent the storage rack 11. Such movement allows the article-handling apparatus 20 to be positioned adjacent to a desired stack of articles. The apparatus 20 includes a carriage 28 which moves vertically along the mast 22 by a suitable drive mechanism, schematically indicated at 29. The carriage 28 has a carrier 30 thereon which is reciprocable toward and away from the storage rack 11. The carrier 30 includes a gear rack 32 which engages a gear 34 carried on the carriage 28. Suitable means are provided to rotate the gear 34 in both directions. Rotation of the gear 34 in one direction causes the carrier 30 to move outwardly away from the mast 22 and toward the storage rack 11. Rotation of the gear 34 in the opposite direction causes the carrier 30 to move in the opposite direction. Reference may be made to application Ser. No. 4,682, filed Jan. 21, 1970, assigned to the assignee of the present invention, for further details of this mechanism.

Figure 4:
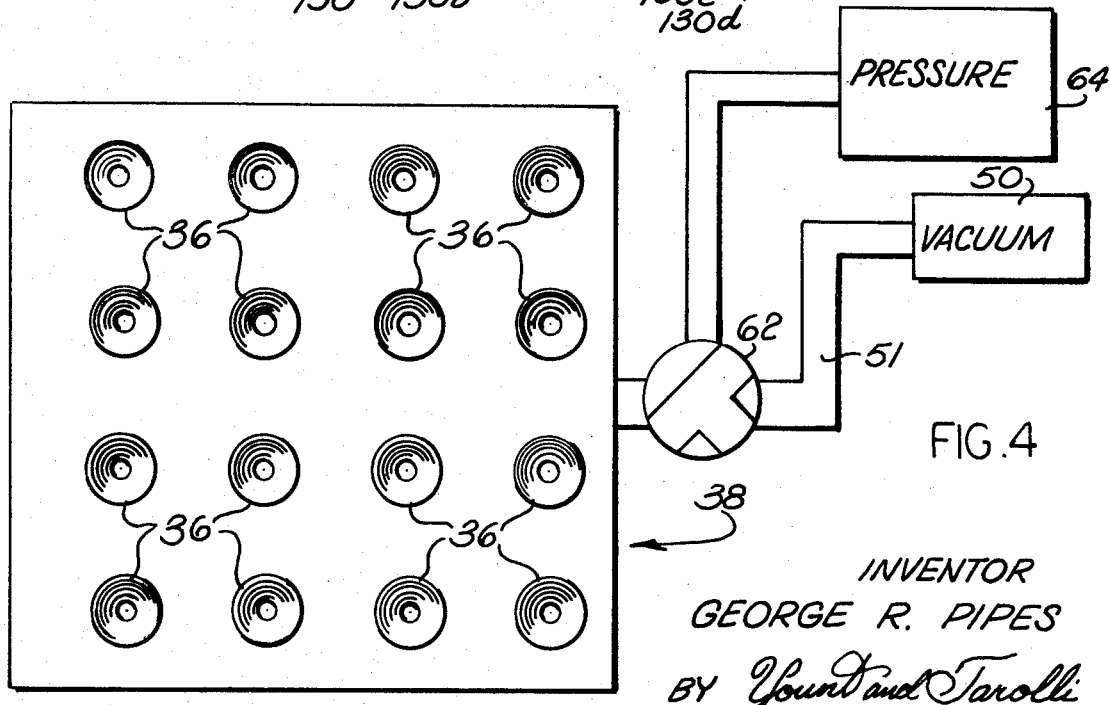
FIG. 4 is a view of a portion of the system shown in FIG. 1, taken along the lines 4—4 thereof.

The carrier 30 has on its outer end, designated 30a, a suitable article-engaging means, broadly designated 38. The article-engaging means 38 comprises a plurality of article-engaging devices arranged in a matrix, as illustrated in FIG. 4. Each of the article-engaging devices comprises a sucker member 36. The matrix of sucker members 36 has a configuration which corresponds with the configuration of one layer of the matrix of articles in the stacks A and B. It should be apparent that the number of sucker members 36 corresponds with the number of articles in one layer of the stacks A and B on the storage rack 11.

When the carrier 30 is moved outwardly away from the mast 22 and over the matrix of articles, the articles may be picked up by the sucker members 36. A suitable source of vacuum 50 is provided for directing vacuum to the article-engaging means 38 and the sucker members 36 thereof. The source of vacuum 50 is connected to the article-engaging means 38 by a conduit means 51 having a valve 62 therein. The article-engaging means 38 includes a manifold, generally indicated in FIG. 2 at 70. The manifold 70 is defined by an upper and a lower plate 72, 74, respectively. The manifold 70 also includes a member 76 interposed between the plates and having an opening 78 therein for receiving the conduit 51. The plates 72, 74 and member 76 define a chamber 70a which has a vacuum applied thereto by the vacuum source 50.

The conduit 51 is designed so that the article-engaging means 38 is movable without disconnecting the fluid connection between the valve 62 and the manifold 70. The conduit 51 is connected to the valve 62, seen in FIG. 1. Normally, the valve 62 is closed until the article-engaging means 38 is positioned over the articles, and then is opened by a suitable control so that vacuum from the vacuum supply 50 is applied to the manifold chamber 70a.

Vacuum is directed from the chamber 70a to each sucker member 36. Each sucker member 36 has a valve 82 associated with it and interposed between the manifold chamber 70a and the sucker member 36. Each valve 82 includes a stem member 84 which is located in a passageway 88 extending through a valve body 86 to connect the manifold chamber 70a to the sucker member 36. Mounted on the end of the valve stem 84 is a valve member 85.

Figure 2:
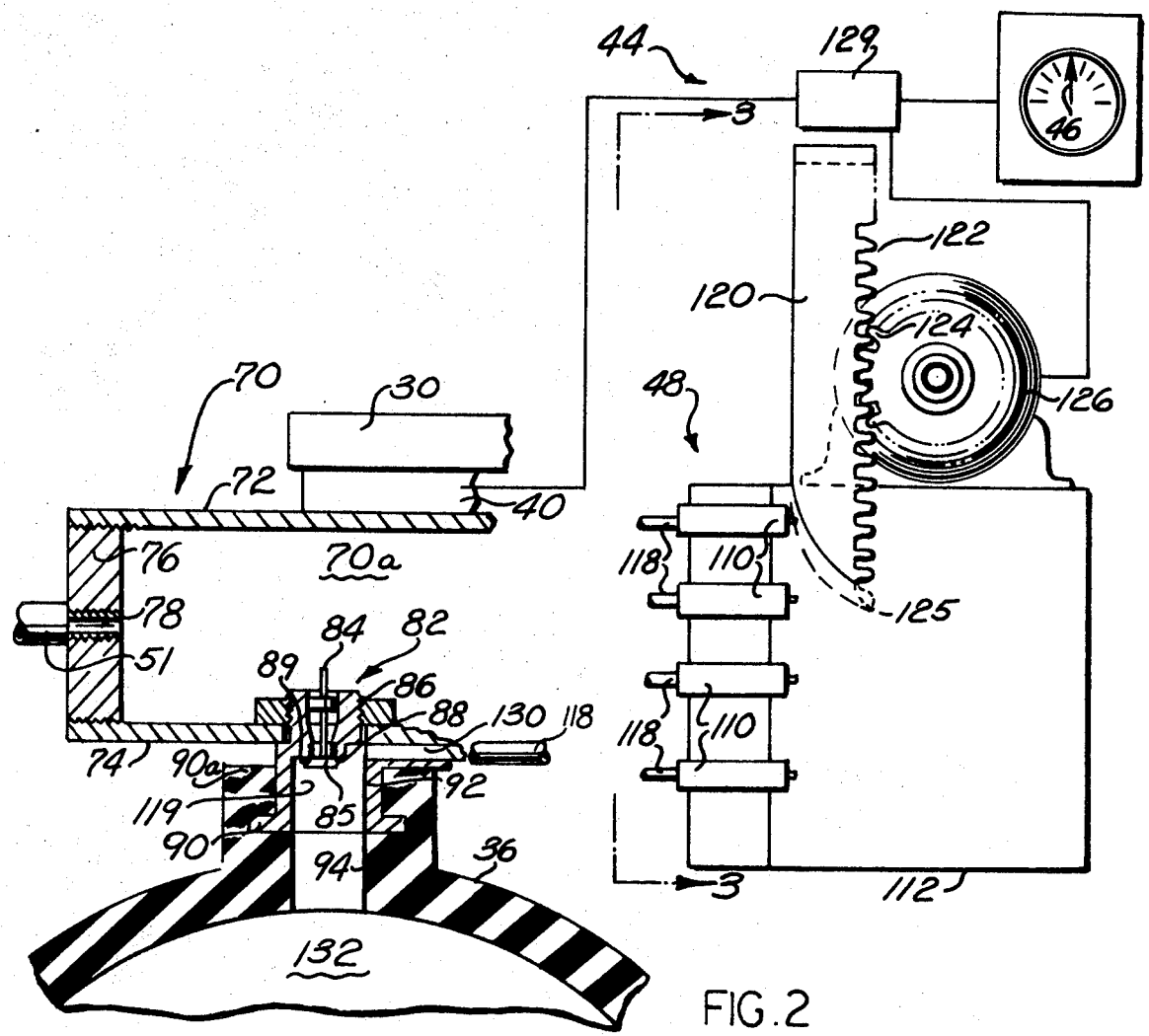
FIG. 2 is an enlarged view of a portion of the system shown in FIG. 1.

The sucker member 36 may be of any suitable design, such as a suction cup of flexible material. The sucker member 36 is secured to the manifold 70 by any suitable means, such as by a flange 90a cooperating with a flange 90 on the valve body 86, as shown in FIG. 2. The sucker member 36 has a chamber 132 to which suction is applied when the valve 85 is in its open position, as shown in full lines in FIG. 5. The valve body 86 also includes a passageway 92 to connect the passageway 88 to a passageway 94 in the sucker member 36. When the valve stem 84 is in the open position, vacuum may be supplied from the vacuum supply 50 to the sucker member 36 by the conduit 51, manifold 70, and subsequently through the passageways 88, 92 and 94 to chamber 132.

Figure 5:
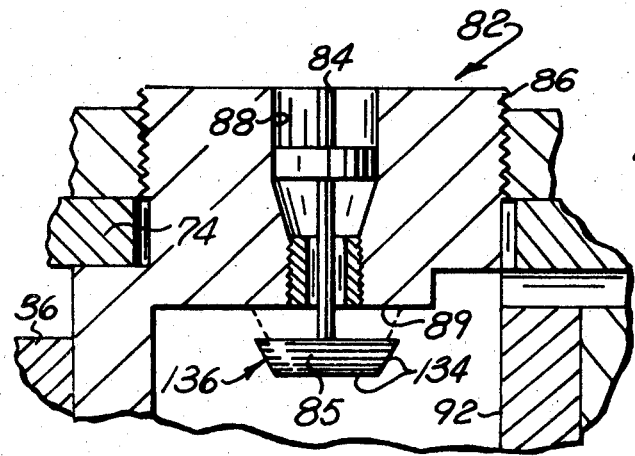
FIG. 5 is an enlarged fragmentary sectional view of a portion of the system shown in FIG. 2.

Each valve 82 is substantially of the same construction as a tire valve. However, the valve includes no spring for holding the valve member 85 in a closed position. In view of the fact that there is no spring holding the valve 85 in a closed position, the valve 85 dangles open due to its own weight, as illustrated in FIG. 5.

When the valve 62 is moved to its open position with the sucker devices located adjacent to articles in the matrix of articles and the valve 85 is in a dangled open position, a vacuum is created or is communicated through the open valve to the sucker device. In the event that the sucker device is over an article, a vacuum is created in the sucker device and there is a minimum air flow past the valve 85. As a result, there is no pressure drop across the valve and, accordingly, the valve remains in an open position and the sucker is activated in order to pick up an article. In the event, however, that the sucker device is over a crack between boxes or is not over an article, when the valve 62 moves to its open position applying suction to such a sucker device, there will be a flow created past the valve 85 and, as a result, there will be a pressure drop provided across the valve and the valve 85 will move to its closed position. The valve will remain in its closed position because of the pressure differential acting across the valve.

Figure 6:
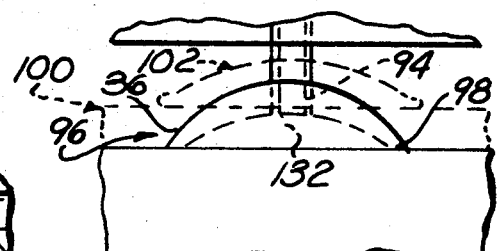
FIG. 6 is a schematic view illustrating different positions of parts of the system shown in FIG. 2.

When in the loading position, the sucker member 36 assumes an undeformed form, generally indicated at 96 in FIG. 6. In the undeformed form, lips 98 of the sucker member 36 contact the article. When a vacuum is drawn through the passageway 94, the article will be raised to a position generally indicated at 100 and the sucker member 36 will deform to a shape, as shown in dotted lines at 102.

From the above, it should be apparent that when the article-engaging means moves over a matrix of articles, all of the suckers which are located over an article are energized in order to pick up articles. It may be desired, however, that only a selected number of articles be picked up by the article-engaging means, and the number of articles picked up by the article-engaging means may be higher than that which is desired. Accordingly, certain of the articles must be dropped from the article-engaging means in order to arrive at the selected number of articles, as desired. In order to accomplish this, certain of the sucker devices 36 must be deactivated.

In order to provide for the above-noted operation, the article-engaging means 38 has a sensor associated therewith. The sensor is generally designated 40 in the drawings and is a load cell of known construction which provides an output signal dependent upon the weight of the number of articles carried by the article-engaging means 38. The sensor 40 provides an output signal dependent upon the weight of the article and controls a control unit, generally designated 48, which in turn deactivates the sucker devices 36 to drop off articles in the event that the number of articles contained on the article-engaging means 38 is greater than the desired number.

The control unit 48 includes a plurality of control valves 110 corresponding in number to the number of sucker members 36. The control valves 110 are mounted in a housing 112, as seen in FIG. 2, and are constructed in a manner well known to those skilled in the art. As seen in FIG. 2, conduits 118 extend from the control valves 110 and communicate with each respective sucker chamber 132. The control valves 110 are in a normally closed position. The control valves 110 are connected with atmosphere, and when a control valve 110 is actuated or opened, atmospheric pressure is applied to the conduit 118, and consequently is applied to the corresponding sucker chamber 132. As a result, if an article is carried by the sucker, it is dropped therefrom.

Figure 3:
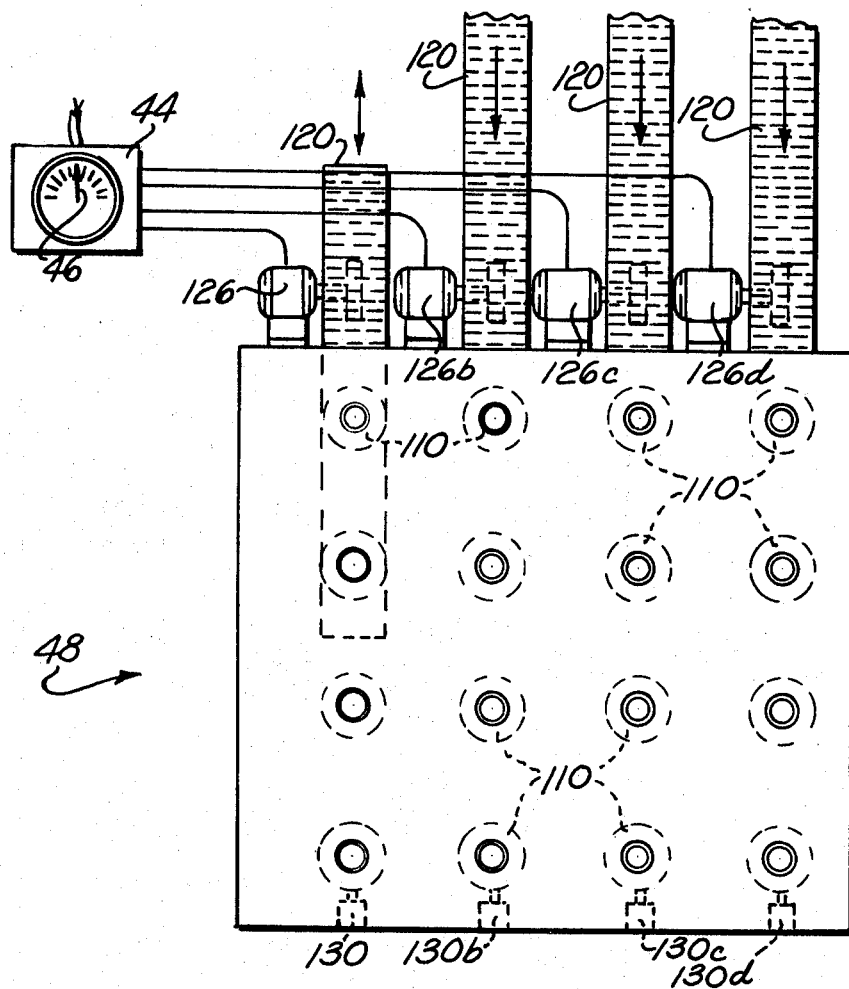
FIG. 3 is an elevational view of a portion of the system shown in FIG. 2 taken along lines 3—3 thereof.

In order to open the control valves 110, slides 120 are provided having gear portions 122 thereon. The gear portions 122 are positioned to mesh with complementary gears 124 drivingly connected to servomotors 126. As shown in FIG. 3, the valves 110 are positioned in a matrix similar to that shown in connection with the suction members 36 in FIG. 4, and each of the control valves 110 is connected to its respective sucker member 36.

It should be noted at this point that the control valves 110 need not be positioned in a matrix but may be in line with each other so that only one slide 120 is required to selectively activate the valves 110. The matrix of control valves 110 illustrated in the drawings is merely representative.

As noted above, the sensor 40 is provided to sense the number of articles supported by the article-engaging means 38. The sensor 40 is a conventional load cell and provides a signal dependent on the weight of the articles supported by the article-engaging means 38. The sensor 40 has one portion connected to the carrier 30 and another portion connected to the article-engaging means 38 so that the weight of the articles carried by the article-engaging means 38 is sensed thereby.

The output signal from the sensor is applied to suitable circuitry, generally indicated at 44. The circuitry includes an adjustable unit 46 which is adjustable to set the predetermined number of articles to be supported by the article-engaging means 38.

The signal from the sensor 40 and the signal from the adjustable unit 46 are applied to a comparator 129. The comparator applies an output signal to the various motors for driving the slides 120, if the signal from the sensor 40 indicates that a number of articles carried thereby, or, more specifically, the weight of the articles carried by the article-engaging means 38 is greater than that which is set in the adjustable unit 46. The output signal from the comparator is applied to a first one of the motors 126 which energizes the slide 120 associated with it to move and deactivate all of the sucker devices which are associated with that slide. Once all of the sucker devices associated with the slide 120 is deactivated, a switch 130 is actuated in order to apply the output signal from the comparator 129 to the next one of the motors 126b, and the motor 126b then will actuate the slide 120 associated with it until all of the sucker devices associated with it are deactivated, at which time switch 130b is actuated to apply the signal from the comparator 129 to the motor 126c. This operation will continue to activate the motors in sequence, until the weight of the articles supported by the article-engaging means is as was set into the adjustable unit 46. When the weight is as was set in unit 45, the signal from comparator 129 will terminate.

Moreover, it should be apparent that if the sucker devices associated with the slide 120 did not pick up articles, the motor 126 would still be energized to drive the slide 120 and deactivate those sucker devices, even though they were already deactivated. No article would be dropped therefrom and such operation would continue until articles are dropped from sucker devices which are supporting the articles.

After the appropriate number of articles are supported, the carriage 28 is raised from the loading position to a raised position 117, as shown in dotted lines in FIG. 1. The article-engaging means is then moved from the position 117 to a retracted position 54 by rotation of the gear 34 to remove the articles from their matrix. At this point, a limit switch 56 in the circuit controlling the valve 62 is activated; however, the valve remains in its normal vacuum position, since another limit switch 60 in the circuit in series with switch 56 has not yet been activated.

The carriage 28 is then moved by the drive means 29 to a lower position so that the articles supported by the article-engaging means 38 are adjacent to the unloading device 58. When the carriage 28 is in this position, the limit switch 60 is activated to move the valve 62 so that the vacuum supply 50 is disconnected from the manifold 70 and a pressure supply 64 is connected thereto. The application of pressurized fluid from the supply 64 to the article-engaging means 38 releases the articles supported thereby. Upon such release, these articles are supported by a suitable unloading device 58.

When a subsequent order is placed, the slide members 120 are returned to their original positions. When the carriage 28 moves to a position adjacent to the matrix of articles from which the new order is to be selected, the article-engaging means 38 picks up articles upon energization of valve 62, as described above.

Having thus described my invention, I claim:

1. An article handling apparatus for removing a predetermined number of articles from a matrix of articles, comprising a plurality of vacuum pickup devices engageable with articles in said matrix, means for activating said vacuum pickup devices to engage the entire matrix of articles for pickup, sensing means for sensing the number of articles actually engaged by said pickup devices, and means responsive to said sensing means to selectively break the vacuum to said pickup devices to deactivate certain of said pickup devices to limit the articles retained for pickup by said pickup devices to a number no greater than said predetermined number.

2. An article-handling apparatus as defined in claim 1 wherein said deactivating means includes control valve means for sequentially deactivating said pickup devices until a predetermined number of articles are supported thereby.

3. An article-handling apparatus as defined in claim 2 wherein said control valve means includes individual control valves connected to individual pickup devices so that when one of said control valves is activated, the respective pickup device connected thereto is deactivated.

4. An article-handling apparatus as defined in claim 1 wherein said pickup means comprises a plurality of suction devices, and said means for activating said suction devices includes valve means responsive to the ability of each suction device to maintain a vacuum which closes to block the application of suction to a suction device if the device is not located over an article.

5. A method for selectively removing a predetermined number of articles from a matrix of articles comprising the steps of positioning vacuum actuated article-engaging means adjacent the matrix of articles at an article pickup position, activating the article-engaging means by applying a vacuum thereto to engage the entire matrix of articles at the article pickup position, sensing the number of articles engaged by the article-engaging means, and selectively breaking the vacuum to certain of said article engaging means to control the number of articles retained by the article engaging means in response to the sensing.

6. An article handling apparatus for removing a predetermined number of articles from a matrix of articles, comprising a plurality of pickup devices engageable with articles in said matrix, means for activating said pickup devices to engage articles in said matrix for pickup, means associated with said pickup devices for lifting and supporting articles engaged thereby, sensing means including a sensor for determining the weight supported by said pickup devices effective to determine the number of articles engaged by said pickup devices, and means responsive to said sensing means to selectively deactivate certain of said pickup devices to control the number of articles engaged for pickup by said pickup devices.

7. A method for selectively removing a predetermined number of articles from a matrix of articles comprising the steps of positioning a plurality of sucker devices adjacent the matrix of articles at an article pickup position, activating the suckers by applying a vacuum thereto to pick up articles at the article pickup position, sensing the number of articles supported by the sucker devices by sensing the weight of the articles picked up thereby, and selectively deactivating certain of the sucker devices if the weight sensed is greater than desired.

* * * * *